US012689622B2

(12) United States Patent
Thompson

(10) Patent No.: US 12,689,622 B2
(45) Date of Patent: Jul. 21, 2026

(54) ENHANCED ONE-TIME PASSCODE DEVICES

(71) Applicant: Wells Fargo Bank, N.A., San Francisco, CA (US)

(72) Inventor: Weston Thackeray Thompson, Claremont, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 64 days.

(21) Appl. No.: 18/444,105

(22) Filed: Feb. 16, 2024

(65) Prior Publication Data

US 2025/0267144 A1     Aug. 21, 2025

(51) Int. Cl.
*H04L 9/40*          (2022.01)
(52) U.S. Cl.
CPC ...... *H04L 63/0838* (2013.01); *H04L 63/0853* (2013.01)
(58) Field of Classification Search
None
See application file for complete search history.

(56) References Cited

U.S. PATENT DOCUMENTS

| | | | |
|---|---|---|---|
| 5,444,768 A | 8/1995 | Lemaire et al. | |
| 6,542,623 B1 | 4/2003 | Kahn | |
| 7,194,620 B1 | 3/2007 | Hayes | |
| 8,769,624 B2 | 7/2014 | Cotterill | |

| | | | |
|---|---|---|---|
| 9,047,473 B2 | 6/2015 | Samuelsson et al. | |
| 9,092,643 B2 * | 7/2015 | Keoh ................. | G06F 21/6245 |
| 9,537,661 B2 | 1/2017 | Khalil et al. | |
| 9,769,157 B2 | 9/2017 | Ibrahim et al. | |
| 10,299,118 B1 | 5/2019 | Karachiwala et al. | |

(Continued)

FOREIGN PATENT DOCUMENTS

| | | |
|---|---|---|
| CN | 106782572 | 4/2020 |
| CN | 112805967 | 8/2023 |

(Continued)

OTHER PUBLICATIONS

"YubiKey Bio Series", [Online]. Retrieved from the Internet: URL: https: www.yubico.com products yubikey-bio-series , (Accessed on Nov. 19, 2023), 13 pgs.

(Continued)

*Primary Examiner* — Bassam A Noaman
(74) *Attorney, Agent, or Firm* — SCHWEGMAN LUNDBERG & WOESSNER, P.A.

(57)          ABSTRACT

A third verification factor is introduced into the two-factor authentication process, thereby establishing a robust three-factor authentication system. Specifically, a One-Time Password (OTP) that is typically generated for authentication purposes undergoes an additional layer of security by utilizing the OTP in a data authentication scheme of a user's chip-enabled credit, debit, banking, or similar card. An enhanced OTP generator sends the OTP to the card, which encrypts either the OTP or a value derived from the OTP (e.g., such as a hash of the OTP) with a cryptographic key associated with the card to create an encrypted authentication token. The encrypted authentication token is then provided to the authenticating party. Also described is an enhanced OTP generation device in the form of a passbook.

15 Claims, 8 Drawing Sheets

(56) References Cited

U.S. PATENT DOCUMENTS

| | | | |
|---|---|---|---|
| 2002/0073045 A1* | 6/2002 | Rubin | G06Q 20/04 |
| | | | 705/65 |
| 2003/0051083 A1 | 3/2003 | Striemer | |
| 2004/0243856 A1 | 12/2004 | Shatford | |
| 2006/0094401 A1* | 5/2006 | Eastlake, III | H04W 12/06 |
| | | | 455/411 |
| 2007/0005963 A1 | 1/2007 | Eldar et al. | |
| 2007/0117553 A1 | 5/2007 | Arnos | |
| 2007/0174904 A1 | 7/2007 | Park | |
| 2007/0203850 A1 | 8/2007 | Singh et al. | |
| 2008/0072303 A1 | 3/2008 | Syed | |
| 2014/0236834 A1* | 8/2014 | Appalsamy | G06Q 20/3276 |
| | | | 705/64 |
| 2015/0281227 A1* | 10/2015 | Fox Ivey | H04L 9/3226 |
| | | | 713/168 |
| 2019/0392417 A1* | 12/2019 | Li | G06Q 20/3227 |
| 2020/0050749 A1 | 2/2020 | Barboi | |
| 2021/0366309 A1 | 11/2021 | Kolar et al. | |
| 2021/0377260 A1* | 12/2021 | Phillips | G06F 21/34 |
| 2022/0148378 A1* | 5/2022 | Verschoor | G07F 17/3293 |
| 2022/0261147 A1 | 8/2022 | Welch et al. | |
| 2024/0289798 A1* | 8/2024 | Koshy | G06Q 20/3829 |
| 2025/0267004 A1 | 8/2025 | Ulrich | |

FOREIGN PATENT DOCUMENTS

| | | |
|---|---|---|
| KR | 20100136339 | 12/2010 |
| KR | 20100136367 | 12/2010 |
| KR | 101499906 | 3/2015 |
| KR | 101561499 | 10/2015 |
| KR | 102157344 | 9/2020 |
| WO | 2010101476 | 9/2010 |
| WO | 2018113526 | 6/2018 |

OTHER PUBLICATIONS

"U.S. Appl. No. 18/581,144, Non Final Office Action mailed Jul. 2, 2025", 12 pgs.

"EMV—Integrated Circuit Card Specifications for Payment Systems", Book 1, Version 4.3, (Nov. 2011), 189 pgs.

"EMV—Integrated Circuit Card Specifications for Payment Systems", Book 2, Version 4.3, (Nov. 2011), 174 pgs.

"EMV—Integrated Circuit Card Specifications for Payment Systems", Book 3, Version 4.3, (Nov. 2011), 230 pgs.

"U.S. Appl. No. 18/581,144, Response filed Oct. 2, 2025 to Non Final Office Action mailed Jul. 2, 2025", 13 pgs.

Banerjee, "Tap Based User Authentication on Smartphones for Visually Impaired People", 9th International Conference on Computing, Communication and Networking Technologies (ICCCNT), Bengaluru, India, (2018), 1-7.

Farghaly, Ahmed Hemdan, "EMV Application Specification :: Offline Data Authentication (ODA)—part I", [Online]. Retrieved from the Internet: URL: https: www.linkedin.com pulse emv-application-specification-offline-data-oda-part-farghaly, (Feb. 23, 2022), 13 pgs.

Farghaly, Ahmed Hemdan, "EMV Application Specification :: Offline Data Authentication (ODA)—part II", [Online]. Retrieved from the Internet: URL: https: www.linkedin.com pulse emv-application-specification-offline-data-oda-part-farghaly-1f, (Mar. 11, 2022), 11 pgs.

Fuglerud, "Secure and Inclusive Authentication with a Talking Mobile One-Time-Password Client", IEEE Security and Privacy, vol. 9, No. 2, (Mar.-Apr. 2011), 27-34.

Henwyn, "An Effective Approach to Speech-Based Email Assistance for Visually Impaired People", 8th International Conference on Trends in Electronics and Informatics (ICOEI), Tirunelveli, India, (2025), 627-632.

Patil, "NetraAadhaar: A Deep Learning-Driven Aadhaar Verification Platform for the Aid of Visually Impaired", IEEE Access, vol. 13, (2025), 74229-74251.

* cited by examiner

GENERATE A TWO FACTOR AUTHENTICATION CODE — 510

DETECT AN NFC ENABLED CARD — 512

TRANSMIT OTP TO NFC ENABLED CARD — 514

RECEIVE SCC — 516

OUTPUT SCC — 518

ENHANCED ONE-TIME PASSCODE DEVICES

TECHNICAL FIELD

Embodiments pertain to improved authentication systems. Some embodiments relate to securing a one-time passcode in a two-factor authentication system with a third factor.

BACKGROUND

Two-factor authentication (2FA) systems provide an enhanced security layer by requiring users to present two distinct forms of identification before granting access to an account, system, or function. The first factor is typically something the user knows, such as a password or PIN, while the second factor is something the user possesses or something inherent to the user, like a biometric characteristic. This dual-layered approach significantly reduces the risk of unauthorized access, as compromising one factor alone is insufficient to breach the system. The second factor can take various forms, including physical tokens, mobile phone notifications, biometric verification, or one-time passwords or passcodes (OTP) such as time-based one-time passwords (TOTPs).

One prevalent method of generating the second factor used in 2FA is the use of TOTP algorithms, which generate temporary passcodes that expire after a short period, such as 30 or 60 seconds. These passcodes are created in some examples by applying a cryptographic hash function to a shared secret key and the current timestamp, ensuring that each code is unique and time sensitive. TOTP systems are widely adopted due to their ease of integration with mobile devices through applications like Google Authenticator, Microsoft Authenticator, or Authy. Users can conveniently generate TOTPs on their smartphones, which serve as the second factor when logging into various services. The widespread use of smartphones has made TOTP a popular choice for 2FA, offering a balance between security and user convenience.

Another common 2FA method involves sending a unique code via SMS or voice call to the user's registered mobile phone number. Upon logging in with their credentials, users receive a text message or call conveying the code, which they must enter to complete the authentication process. While this method is user-friendly and does not require a smartphone app, it is considered less secure than TOTP due to potential vulnerabilities in the telecommunication infrastructure, such as SIM swapping attacks. Despite these concerns, SMS-based 2FA remains in use due to its accessibility, especially in scenarios where users may not have access to a smartphone app or when additional backup methods are needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
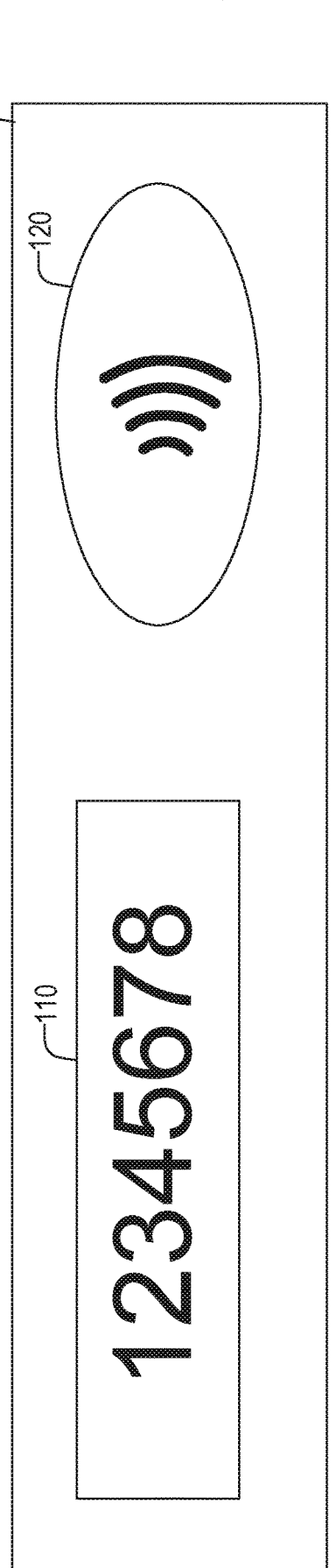
FIG. 1 illustrates an example enhanced OTP generation device according to some examples of the present disclosure.

As mentioned in the Background, OTP systems are a cornerstone of two-factor authentication systems, providing an additional layer of security beyond traditional username and password login credentials. However, despite their widespread adoption and the enhanced security they offer, TOTPs are not without their vulnerabilities and limitations, particularly when used for highly sensitive transactions such as those in the financial or banking sectors.

One of the primary concerns with OTP is its reliance on the shared secret key remaining confidential. If this key is exposed through phishing, malware, or a data breach, malicious actors can generate valid OTP codes and gain unauthorized access to user accounts. Additionally, the time synchronization requirement between the server and the user's OTP-generating device can lead to potential issues. If there is significant time drift or if the user's device clock is not accurately set, legitimate access may be erroneously denied, or an attacker could exploit this window to generate valid codes.

SMS-based two-factor authentication also has several vulnerabilities that compromise its effectiveness, particularly for securing highly sensitive transactions. The inherent risks associated with SMS-based 2FA stem from the potential for interception and eavesdropping, where attackers exploit weaknesses in the global telecommunication network's signaling protocols to access OTPs. Additionally, the threat of SIM swapping is significant; attackers deceive mobile carriers to transfer a victim's phone number to a new SIM card under their control, thereby redirecting all incoming messages, including OTPs, to the attacker.

Further, the susceptibility of mobile phones to malware presents a risk where malicious software can capture and relay SMS messages to an attacker. Phishing attacks further exacerbate the security concerns, as users can be tricked into divulging their OTPs on fraudulent websites. Social engineering tactics can also lead to unauthorized access to a user's phone number or message redirection. The non-encrypted nature of SMS delivery means that messages can be read by unauthorized parties with network access, and the loss or theft of a mobile device can result in OTPs falling into the wrong hands. Finally, the reliability of SMS-based 2FA is contingent on mobile network availability, which can be inconsistent, leaving users without the ability to receive OTPs in areas of poor service or when traveling without adequate roaming capabilities.

Given these security challenges, current 2FA does not offer the robust protection required for transactions involving critical financial, healthcare, or confidential government data. In such contexts, alternative authentication mechanisms that provide stronger defenses against interception and unauthorized access than OTP may be used to ensure the integrity and confidentiality of sensitive transactions.

The present disclosure encompasses various embodiments, including methods, systems, devices, and machine-readable mediums, designed to enhance authentication security by incorporating a third verification factor into the two-factor authentication process, thereby establishing a robust three-factor authentication system. Specifically, a One-Time Password (OTP) that is typically generated for authentication purposes undergoes an additional layer of security by utilizing the OTP in a data authentication scheme of a user's chip-enabled credit, debit, banking, or similar card. An OTP generator sends the OTP to the card, which encrypts either the OTP or a value derived from the OTP (e.g., such as a hash of the OTP) with a cryptographic key associated with the card to create an encrypted authentication token. The encrypted authentication token is then provided to the authenticating party. This encrypted token is herein referred to as a "Secure Chip Code" or SCC. The SCC is then utilized for authentication instead of the standard OTP.

An entity responsible for authentication, herein referred to as the "authenticating party," may utilize the above process to confirm that not only does the user possess the Enhanced OTP generation device with the shared secret but also a chip card issued by a trusted party. The authenticating party can confirm the validity of the SCC by decrypting it using a corresponding key to the card's cryptographic key that was used to encrypt the SCC. The unencrypted authentication token, or portions of the unencrypted authentication token, may be compared against a verification value. The verification value is either an OTP generated by the authenticating party using the shared secret or a value based upon the OTP generated by the authenticating party such as a hash, depending on whether the encrypted token is the encrypted OTP itself or an encrypted hash. If the unencrypted authentication token, or portions of the unencrypted authentication token match the verification value the SCC may be validated. If the unencrypted authentication token, or portions of the unencrypted authentication token do not match the verification value, the SCC may not be validated. SCC validation may complement other authentication methods, such as usernames and passwords. This extra layer of authentication can be particularly beneficial for granting access to services requiring higher security, such as certain high-risk banking transactions and high-security computing systems. In addition, this authentication scheme reduces the chances of a man-in-the-middle attack being able to steal the OTP as the OTP is never sent to the authenticating party. Rather, a digitally signed version of the OTP is sent instead. Alternatively, due to its association with a user's card, the SCC could replace traditional login credentials, offering a more convenient authentication method for certain network-based services. This may be beneficial in online banking services where the user's card is tied to their financial accounts.

In some examples, the SCC may be generated using the Dynamic Data Authentication (DDA) process of the Europay, Mastercard, and Visa (EMV) cards. In these examples, to generate an SCC, the user presents a valid chip-enabled credit, debit, or banking card to a Near Field Communication (NFC) reader or chip-card reader integrated within or communicatively coupled to an Enhanced OTP generation device, which could be a mobile phone, keyfob, passbook, or similar device. The Enhanced OTP generation device creates an OTP based on a secret that it shares with a network-based service. It then communicates the OTP, or a derivative of the OTP, to the chip-enabled card.

The chip-enabled card calculates an encrypted token using the OTP. For EMV DDA implementations, the token may be a data structure comprising a chip-specified value and a hash of the chip-specified value and the OTP. The token is then encrypted to create the encrypted token (the SCC). The token may be encrypted using an Integrated Circuit Card (ICC) private key programmed into the card. The SCC is then sent back to the Enhanced OTP generation device, and a representation of the SCC, which could be the full SCC or a truncated version, is provided to the authenticating party.

While the above example using EMV DDA utilized an encrypted token with a chip-specified value and a hash of the chip-specified value, in some other examples, the encrypted token may simply be an encrypted version of the OTP.

In some examples, the SCC is provided to the authenticating party such as a network-based service from the SCC generation device automatically. For example, by transmitting the SCC to the authenticating party directly from the enhanced OTP generation device, transmitting the SCC to a user's computing device from the enhanced OTP generation device (the user's computing device may then transmit the SCC to the authentication party), or the like. In other examples, the enhanced OTP generation device may display the SCC on a display and a user may manually input the SCC into their computing device (e.g., in a prompt in a user interface).

Upon receipt, the authenticating party may assess the received SCC as part of a multi-factor authentication process. The verification of the SCC's accuracy may be a sole criterion, in some examples, for authentication but may also be one factor of a plurality of factors for authentication. Along with the valid SCC, additional authentication factors may be evaluated before the network-based service authorizes user access to protected resources. Such resources may include, but are not limited to, network access, the execution of sensitive financial transactions, or other restricted services, information, or functions. The comprehensive authentication process ensures that access is securely granted only after all required authentication factors have been satisfactorily verified.

In some examples, the authenticating party can determine the accuracy of the SCC received from the client device by decrypting it first using a key corresponding to the cryptographic key of the card (e.g., a public key). The decrypted SCC is then compared to verification data known to the authenticating party to determine if the SCC is valid. The verification data may be based upon an OTP generated by the authentication party. In some examples, the decrypted SCC is directly compared to the OTP generated by the authentication party to determine if they match. In other examples, such as implementations using EMV DDA, the decrypted SCC includes card specified information that is hashed along with the generated OTP to generate the verification data. Both the card and the authenticating party utilize a same hash algorithm and the authenticating party and the OTP generating device may utilize a same algorithm and shared secret to generate the OTP. If the decrypted SCC matches the verification data, the SCC is verified; if the decrypted SCC does not match the verification data, the SCC is not verified.

In certain embodiments, the authenticating party such as the network-based service may forward the received SCC to the card issuer for decryption. The issuer then returns the decrypted OTP hash. In some examples, the decrypted OTP hash may be protected using Transport Layer Security (TLS) or other encryption between the authenticating party and the card issuer. Alternatively, the card issuer might supply the public key of the chip-enabled card directly to the authenticating party, enabling the latter to perform the decryption process. In some scenarios, the issuer system and the authenticating party may be operated by the same organization or entity, thereby streamlining the authentication process.

Another limitation of both TOTP and SMS-based two-factor authentication systems is their dependency on the user possessing a cellular phone or other device that creates the TOTP code. This requirement can be exclusionary, as certain populations and individuals may not use or have access to mobile devices due to various reasons such as economic constraints, personal choice, or living in areas with inadequate cellular infrastructure. Elderly users or those resistant to technology adoption may also find it challenging to engage with these forms of 2FA, leading to a digital divide where a segment of the population is unable to benefit from the enhanced security that these systems provide. Consequently, reliance on cellular phones for authentication can inadvertently disenfranchise users and create barriers to accessing services that mandate such security measures, underscoring the need for more inclusive authentication solutions that cater to the diverse circumstances of all potential users.

Building upon, or instead of, the innovative security measures previously described, the disclosed embodiments also introduce a modernized passbook, which serves as a physical authentication device reminiscent of traditional bank passbooks. This passbook may include an OTP generation device and in some examples, an Enhanced OTP generation device that may include an NFC reader that allows it to generate an SCC. Each passbook may be assigned a distinctive serial or device number, which is securely associated with the customer's account. The passbook is designed to display a rotating OTP or SCC, which the customer can then use for various authentication purposes, such as authentication purposes associated with a bank. The modernized passbook may include a bank passbook for one or more accounts with physical pages.

The versatility of the passbook may allow it to be utilized across multiple customer service touchpoints, including call centers, websites, and in-branch transactions, thereby providing a seamless and secure authentication experience. To further enhance security, the passbook may incorporate a biometric component—such as a fingerprint reader—that the customer must use to gain access to the OTP or SCC display, ensuring that only the authorized user can view and use the OTP or SCC. In addition to these features, or instead of the biometric features, the passbook may include an integrated Near Field Communication (NFC) card reader. The NFC reader may be used, as previously disclosed to provide an enhanced Secure Chip Code (SCC). This modern passbook may make the use of OTP password generation devices more comfortable for more traditional customers of a financial institution due to the familiarity of the passbook. This may allow customers who prefer to eschew mobile devices, but still do occasional online banking from a desktop, to access transactions and functions of a financial institution that are protected by multi-factor authentication. As used herein, an enhanced OTP generation device refers to either a traditional OTP device integrated with a passbook or an enhanced OTP generation device that generates an SCC instead of a traditional OTP.

In some examples, in addition to using the EMV DDA or CDA operations to generate the SCC, the enhanced OTP generation device or passbook may also authenticate the card using DDA or CDA while generating the SCC. For example, using the EMV DDA or CDA operations to verify that the returned encrypted token (e.g., signature) is valid. In some examples, the enhanced OTP generation device or passbook may only display or transmit the SCC upon determining that it is valid according to the DDA or CDA operations. DDA is a security protocol within the EMV framework that enhances the authentication process of payment cards during offline transactions. The protocol utilizes a digital signature mechanism, leveraging a card-specific key pair—comprising the Integrated Circuit Card (ICC) public and private keys.

To verify the digital signature, the enhanced OTP generation device must first retrieve and reconstruct the ICC public key using the issuer's public key. The enhanced OTP generation device obtains the issuer's public key by decrypting the Issuer Public Key Certificate, which is stored on the card and encrypted by a trusted Certification Authority (CA). The Enhanced OTP generation device, preloaded with the CA's public key, retrieves (from the card), and decrypts the Issuer Public Key Certificate to extract the issuer's public key.

With the issuer's public key, the Enhanced OTP generation device proceeds to retrieve (from the card) and decrypt the ICC Public Key Certificate, to obtain the full ICC public key. Utilizing the ICC public key, the Enhanced OTP generation device decrypts the digital signature received from the card. If the decrypted hash from the digital signature matches a hash of the OTP and card specified information (received as part of the decrypted digital signature) generated by the Enhanced OTP generation device using the same hash function, the card is authenticated as genuine. This verification process ensures the card's presence and integrity, confirming that the card is not a cloned or fraudulent copy. The successful verification of the digital signature via DDA signifies a secure transaction, allowing the code display process to continue with confidence in the card's legitimacy.

The Enhanced OTP generation device may utilize Combined Dynamic Data Authentication (CDA) as an alternative to DDA. CDA is an enhanced security protocol for EMV card transactions that integrates the verification features of DDA with the creation of an Application Cryptogram, offering increased protection, particularly for offline transactions. It ensures the authenticity of the card and the integrity of the transaction data. In the CDA process, the card issuer and the ICC each utilize a key pair, which includes a private and a public key. The issuer signs the ICC's public key with its private key, producing an ICC Public Key Certificate that is stored on the card. During a transaction, the Enhanced OTP generation device authenticates the ICC Public Key Certificate using the issuer's public key to confirm the card's legitimacy. The device then generates an OTP and sends it to the card, which uses its ICC private key to sign the OTP and transaction data. This digital signature, along with a cryptographic summary of the transaction data known as the Application Cryptogram, is sent back to the Enhanced OTP generation device. The device verifies the digital signature using the ICC public key, ensuring the card's authenticity and the transaction data's integrity. Upon successful verification of both the digital signature and the Application Cryptogram, the enhanced OTP generation device concludes the card's genuineness and the untampered status of the transaction data, allowing it to provide the two-factor authentication code to the user.

In some examples, such as with using CDA, the Enhanced OTP generation device may provide transaction data to the card. The transaction data for a payment transaction would be details about a payment transaction. For the purposes of the present disclosure, this transaction data may be static data known to both the authenticating party and the Enhanced OTP generation device. In other examples, the transaction data may be authentication specific. That is, when the authenticating party (e.g., the network-based service) issues the two-factor challenge for a SCC or OTP code, the authenticating party may provide a code of its own that is entered into a user interface of the Enhanced OTP generation device or passbook. This code is used as the transaction data and is then verified along with the OTP at the authenticating party. This may add an additional layer of security as a user would then have to also have access to the code sent by the authenticating party. In still other examples, rather than utilize the OTP as the nonce, the OTP may be included in the transaction data.

FIG. 1 illustrates an example enhanced OTP generation device 105 according to some examples of the present disclosure. The enhanced OTP generation device 105 includes a display 110 and NFC reader 120. Display 110 may display an OTP or SCC generated by hardware processing logic in the device. In some examples, the display may display numeric numbers, alphanumeric characters, or the like. While the display 110 is shown displaying 8 numbers, a person of ordinary skill in the art will appreciate that more or fewer numbers may be displayed concurrently.

As previously described, a SCC is generated based upon an OTP generated by the device using one or more algorithms such as TOTP. Time-Based One-Time Password (TOTP) is an authentication mechanism that generates temporary passcodes using a shared secret key and the current timestamp, ensuring each code is unique and valid for a short period. In some examples, TOTP utilizes a Hash-Based Message Authentication Code (HMAC) combined with a cryptographic hash function, such as SHA-1, SHA-256, or SHA-512, to convert the timestamp and shared secret into a one-time code. The process involves taking the current timestamp, representing it as a counter value that counts the number of time steps since an epoch, and then applying the HMAC algorithm to this counter value using the shared secret key. The resulting HMAC output is then truncated to produce a numeric code, typically 6 to 8 digits long, which is the TOTP.

The NFC reader 120 may support contactless NFC protocols for interfacing with a chipcard. In other examples, the Enhanced OTP generation device 105 may have a chip-card reader. In some examples, the system may utilize EMV protocols such as Static Data authentication (SDA), Dynamic Data Authentication (DDA), or Combined DDA (CDA) processes to generate the SCC from the OTP as previously described. In some examples, the OTP is generated periodically, and an SCC is displayed only when a chip-based contactless card is presented to the NFC reader 120. In still other examples, the OTP is generated in response to detection of a chip-based contactless card being presented to the NFC reader 120.

Figure 2:
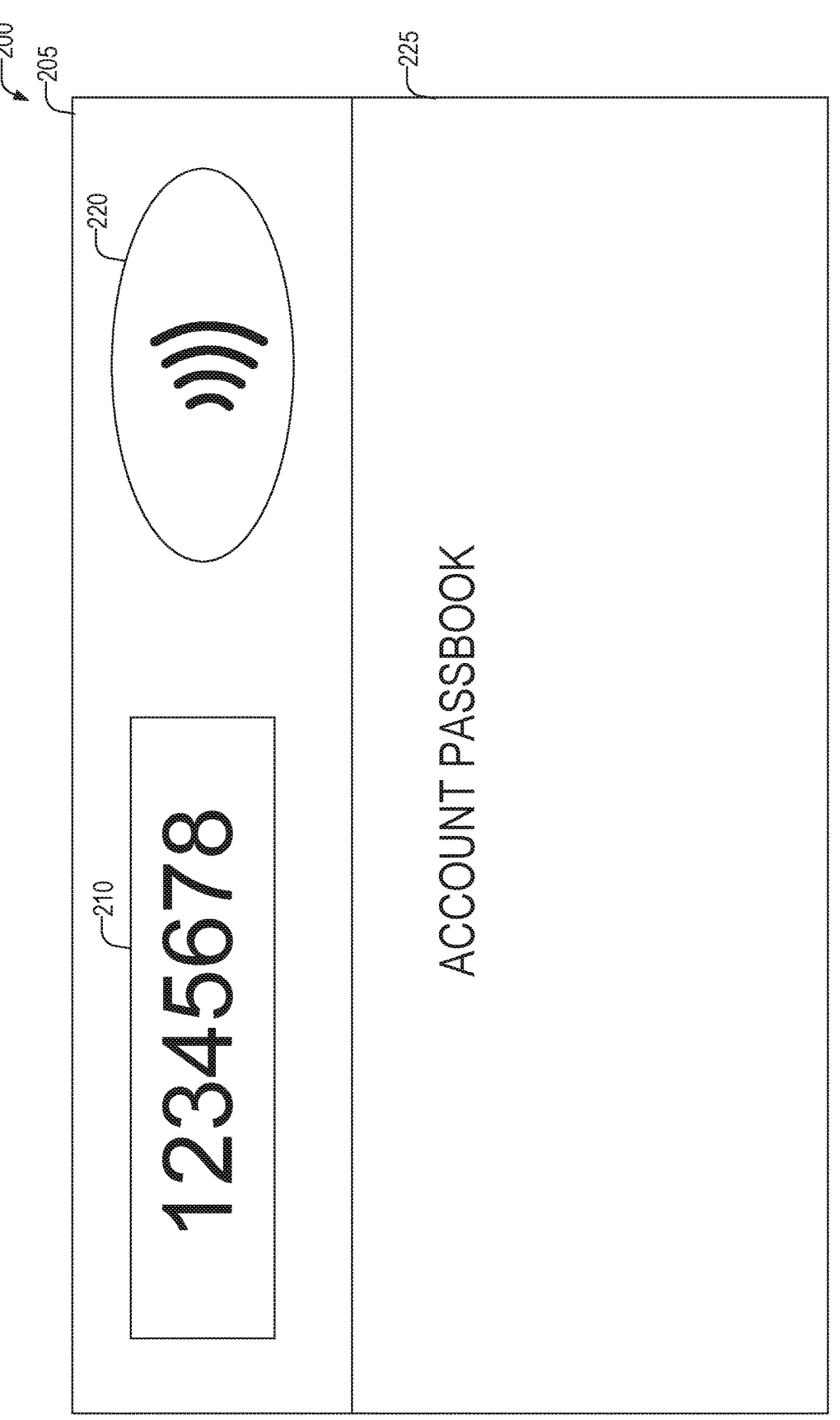
FIG. 2 illustrates a modified passbook with an Enhanced OTP generation device according to some examples of the present disclosure.

FIG. 2 illustrates a modified passbook 200 with an Enhanced OTP generation device 205 according to some examples of the present disclosure. The Enhanced OTP generation device 205 includes a display 210 and account passbook 225. Display 210 may display an OTP or SCC generated by hardware processing logic in the device. The SCC is generated based upon the methods described herein by using a chip-based card. The NFC reader 220 may support contactless NFC protocols for interfacing with a chipcard. For example, the system may utilize EMV protocols such as Static Data authentication (SDA), Dynamic Data Authentication (DDA), or Combined DDA (CDA) processes to generate the SCC from the OTP as previously described. In some examples, the NFC reader 220 is omitted and the display 210 displays a standard OTP code rather than an SCC.

Account passbook 225 may have a plurality of pages with a binding on one of the four sides. That is, the pages may open up to the top, concealing the display 210 and the NFC reader 220. In other examples, the pages may open to either side or to the bottom. Inside the pages may have lines, tables, or the like to allow the account holder to record their deposits and/or withdrawals. The passbook may be updated by a bank teller or other employee upon a deposit and/or withdrawal.

As previously noted, in some examples, the modified passbook 200 may include a biometric reader that may cause the enhanced OTP generation device 205 to output a SCC or OTP only after the user successfully presents a recognized biometric sample. Biometrics may include a fingerprint, voice sample, iris sample, facial recognition, or the like. The biometric sample collected may be compared to a template stored in the device that was programmed into the device when the device was issued to the user. Upon a match, the device may display the OTP or SCC in display 210 or transmit the SCC or OTP to another device.

Figure 3:
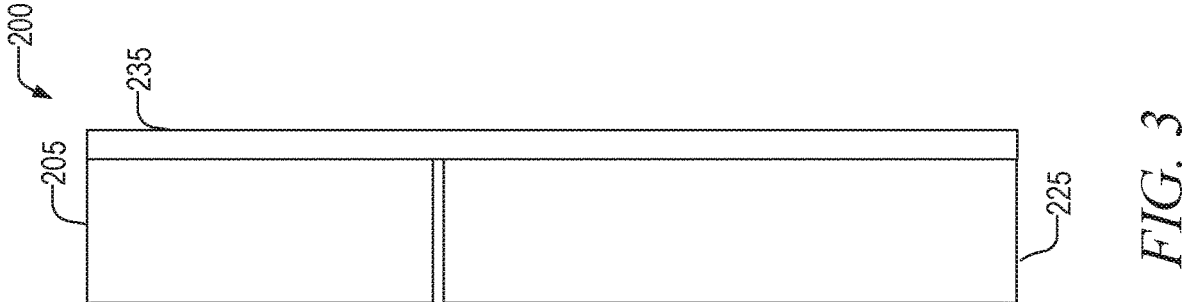
FIG. 3 illustrates a side-view of the modified passbook according to some examples of the present disclosure.

FIG. 3 illustrates a side-view of the modified passbook 200 according to some examples of the present disclosure. The account passbook 225 and the Enhanced OTP generation device 205 may be held together by backing 235, which may be cardboard, plastic, metal, or other suitable material.

Figure 4:
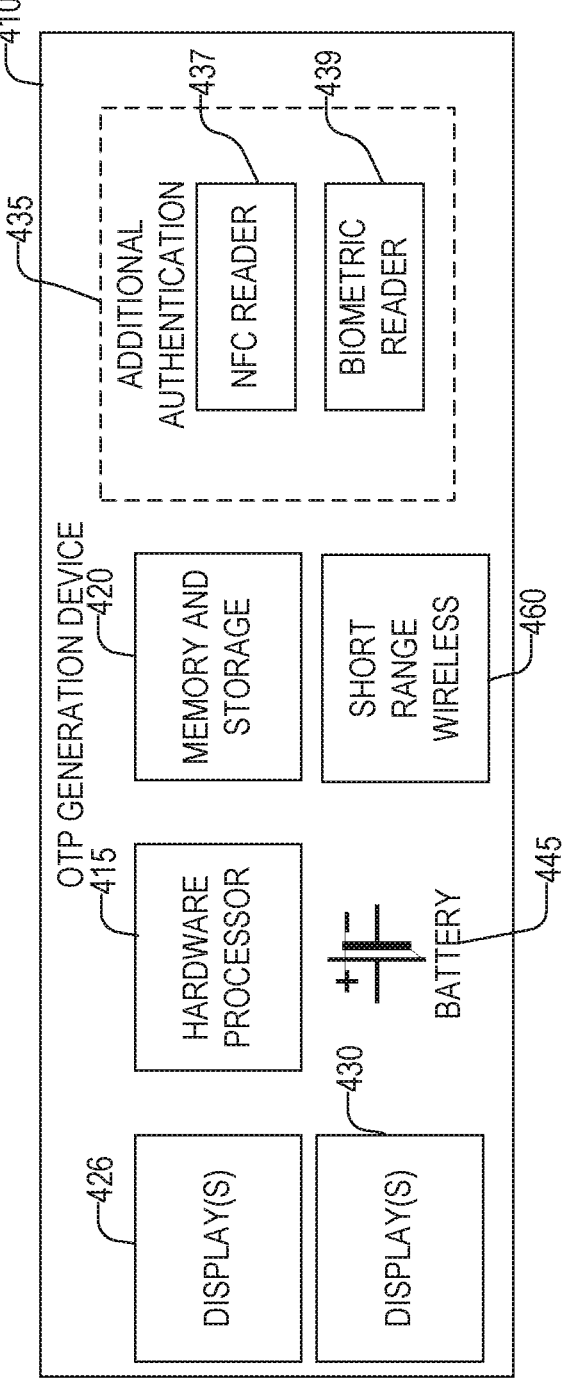
FIG. 4 illustrates a logical block diagram of an enhanced OTP generation device according to some examples of the present disclosure.

FIG. 4 illustrates a logical block diagram of an enhanced OTP generation device 410 according to some examples of the present disclosure. Hardware processor 415 may be a microprocessor, a central processing unit (CPU), an application specific integrated circuit (ASIC) or the like. Hardware processor 415 may be specially designed to perform the operations described herein exclusively in hardware, using a combination of specially designed hardware and general purpose hardware executing software, or using general purpose hardware executing software. In some examples, the hardware processor 415 may execute one or more instructions, which may be stored in memory and storage 420. The instructions may cause the hardware processor 415 to perform the operations disclosed herein.

Example operations performed by hardware processor 415 may include generating a two factor authentication code such as an OTP. Such codes may be generated according to one or more methods. Example methods may include TOTP which generate a one-time password using a shared secret key and the current time as inputs. The TOTP algorithm may use an HMAC (Hash-Based Message Authentication Code) combined with a cryptographic hash function, such as SHA-1, SHA-256, or SHA-512, to convert the timestamp and shared secret into a one-time code. The process involves taking the current timestamp, representing it as a counter value that counts the number of time steps since an epoch, and then applying the HMAC algorithm to this counter value using the shared secret key. The resulting HMAC output is then truncated to produce a numeric code, typically 6 to 8 digits long, which is the TOTP. In some examples, the methods may utilize a seed or timer that is shared between the authenticating party and the Enhanced OTP generation device 410. This value may be pre-programmed into the device and may be stored in memory and storage 420 as well as being stored at the authenticating party.

Memory and storage 420 may be one or more of: random access memory (RAM), read-only memory, flash memory, solid state memory, and the like. Memory and storage 420 may include both volatile and non-volatile storage. Memory and storage 420 may be a machine-readable medium that may store one or more instructions that are provided to hardware processor 415. Hardware processor 415 may utilize the memory and storage 420 to store values during execution of the instructions. Battery 445 may be a power source such as a rechargeable battery, coin cell battery, AA or AAA battery or batteries, or the like. Battery 445 may be replaceable or integrated. Battery 445 may provide power for the components of the Enhanced OTP generation device 410.

Display(s) 426 may be liquid crystal display (LCD), Light Emitting Diode (LED) display, Organic Light Emitting Diode (OLED) display, e-ink display, or the like. Display(s) 426 may output an OTP, SCC, or the like. Buttons 430 may control the output of the OTP through the other user interface methods.

Short range wireless component 460 may communicate with one or more computing devices over a short-range wireless link. Example short-range wireless links include those with a typical practical range of 100 meters or less and include 802.11 networks (e.g., WIFI), Bluetooth, Near Field Communications, or the like. In some examples, the short range wireless component 460 may transmit the SCC or OTP code from the Enhanced OTP generation device 410, over the short-range wireless link, to a computing device of the user that is being used to access a network-based service that uses the SCC or OTP to authenticate. The computing device of the user may then transmit the SCC or OTP to the network-based service. This may be useful, for example, when the encrypted token is large and must be completely transferred—making manual entry impractical or inconvenient.

Additional authentication components 435 may include an NFC reader 437 and associated EMV logic—which may reside on the NFC reader 437 (e.g., in a microprocessor of the NFC reader 437) or may reside in the hardware processor 415, or in instructions stored in memory and storage 420 which cause the processor to perform the EMV operations. In some examples, the Enhanced OTP generation device may include a biometric reader 439, which may be one or more of a fingerprint reader, iris reader, facial recognition camera, microphone for voice recognition, and the like. The biometric reader, the hardware processor 415, or both may compare a biometric sample with a pre-stored template. If the sample matches the template the user is authenticated and the hardware processor 415 may send the OTP or SCC to the display(s) 426 for output.

While FIG. 4 illustrated a logical block diagram of a separate Enhanced OTP generation device, the functions and components of Enhanced OTP generation device 410 may be integrated into a computing device of the user such as a laptop, tablet, desktop, mobile phone, or the like.

Figure 5:
FIG. 5 discloses a flowchart illustrating a method of generating a Secure Chip Code for authentication according to some examples of the present disclosure.
Figure 5:
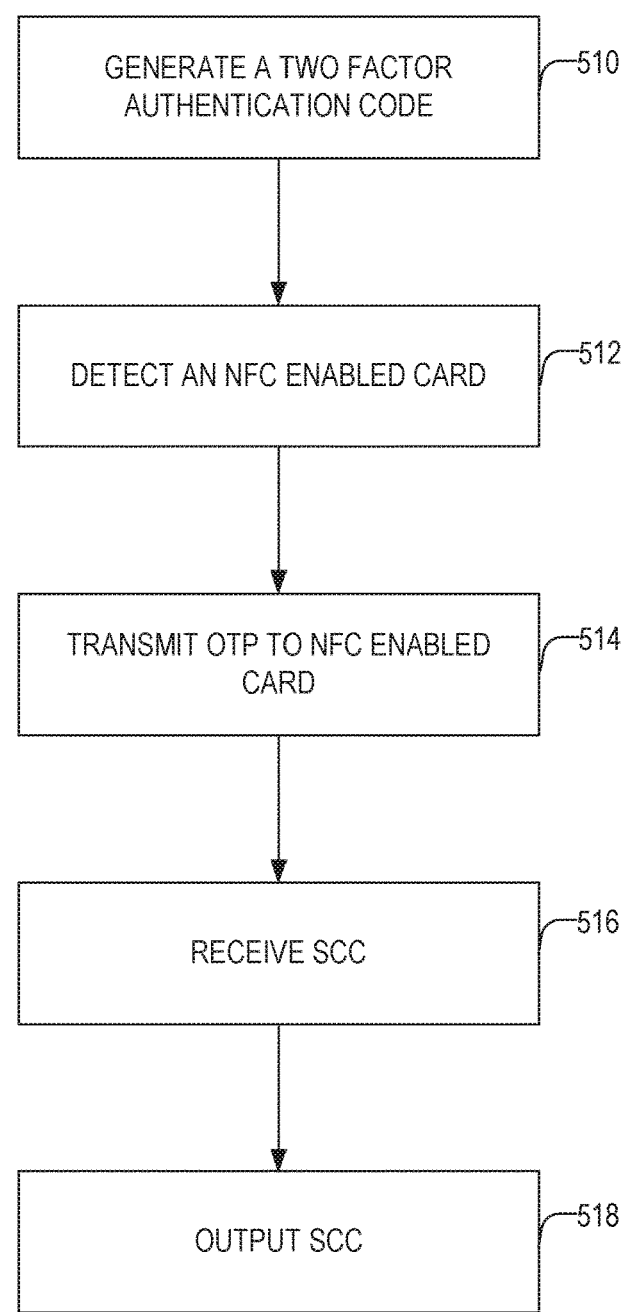

FIG. 5 discloses a flowchart illustrating a method 500 of generating a Secure Chip Code for authentication according to some examples of the present disclosure. Method 500 may be executed by an Enhanced OTP generation device, such as a mobile phone, keyfob, or enhanced passbook in collaboration with a chip-enabled card to fortify the security of a two-factor authentication system by introducing an additional verification factor.

At operation 510, the Enhanced OTP generation device generates a two-factor authentication code (an OTP code). This operation may be executed by the hardware processor within the device, which utilizes a cryptographic algorithm to produce a One-Time Password (OTP). The OTP is generated based on a shared secret key and the current timestamp, as described previously.

Operation 512 involves the Enhanced OTP generation device detecting the presence of an NFC-enabled card, such as a chip-enabled credit, debit, or banking card. The device employs a built-in NFC reader to identify the card when it is presented by the user. This operation establishes a communication channel between the device and the card. In some examples, operation 510 happens periodically, e.g., upon expiry of an OTP, a new OTP is generated. In other examples, operation 510 may happen in response to operation 512.

In Operation 514, the Enhanced OTP generation device transmits the generated OTP to the NFC-enabled card—e.g., over the Near Field Communication link. The card, which is equipped with a microchip containing a private key, receives the OTP. In some examples, the card encrypts the OTP to generate an encrypted token and sends it back over the NFC link. In other examples, the card calculates a hash of the OTP and a value specified by the card. The hash, the value specified by the card, and other fields are assembled into a token that is then encrypted with the private key and sent back to the Enhanced OTP generation device. As used herein, the token is a datastructure with one or more fields related to authentication. The encrypted token is an encrypted version of the token. The encrypted token is also referred to herein as the SCC.

At operation 516, the Enhanced OTP generation device receives the SCC from the NFC-enabled card. Finally, at operation 518, the Enhanced OTP generation device outputs the SCC.

In scenarios where the authenticating party receives only a truncated portion of the Secure Chip Code (SCC), the system is configured to validate the SCC without the need for decryption of the truncated part. This is accomplished by enabling the authenticating party to construct an equivalent SCC independently. To achieve this, the authenticating party must have access to the necessary components that were used to create the original SCC.

If symmetric encryption is used, the authenticating party must possess the encryption key that was initially used to encrypt the full SCC, along with any card-specified values. With these elements, the authenticating party can encrypt the One-Time Password (OTP) or a hash of the OTP, along with the card-specified value, to generate a complete SCC. Once the full SCC is constructed, the authenticating party can then compare the relevant truncated portion with the corresponding segment of the user-provided SCC to verify its authenticity.

In the case of asymmetric encryption, the authenticating party would need access to the private key associated with the card's public key. With the private key, the authenticating party can encrypt the OTP or its hash, along with the card-specified value, to create a new SCC. The authenticating party then compares the truncated encrypted portion received from the user with the equivalent part of the newly generated SCC.

In other examples, instead of displaying the SCC or OTP, the Enhanced OTP generation device may transmit the OTP to another computing system which may then utilize it for authentication. In these examples, the system authenticating the SCC may then decrypt the SCC to extract the authentication token. It may then utilize the locally generated OTP to validate the contents of the decrypted token. For example, by comparing the OTP to the decrypted token; comparing a hash of the OTP and card specified data to a hash of the locally created OTP and the card specified data; or the like.

In some examples, the data created by the authenticating party—e.g., the encrypted token, hash, or the OTP itself may be termed "verification data." If the verification data matches the received data, the service confirms the validity of the SCC and grants the user access to the requested secure function or service. This multi-factor authentication process, which now includes the SCC as an additional factor, provides a more robust defense against unauthorized access, particularly for transactions requiring heightened security.

Figure 6:
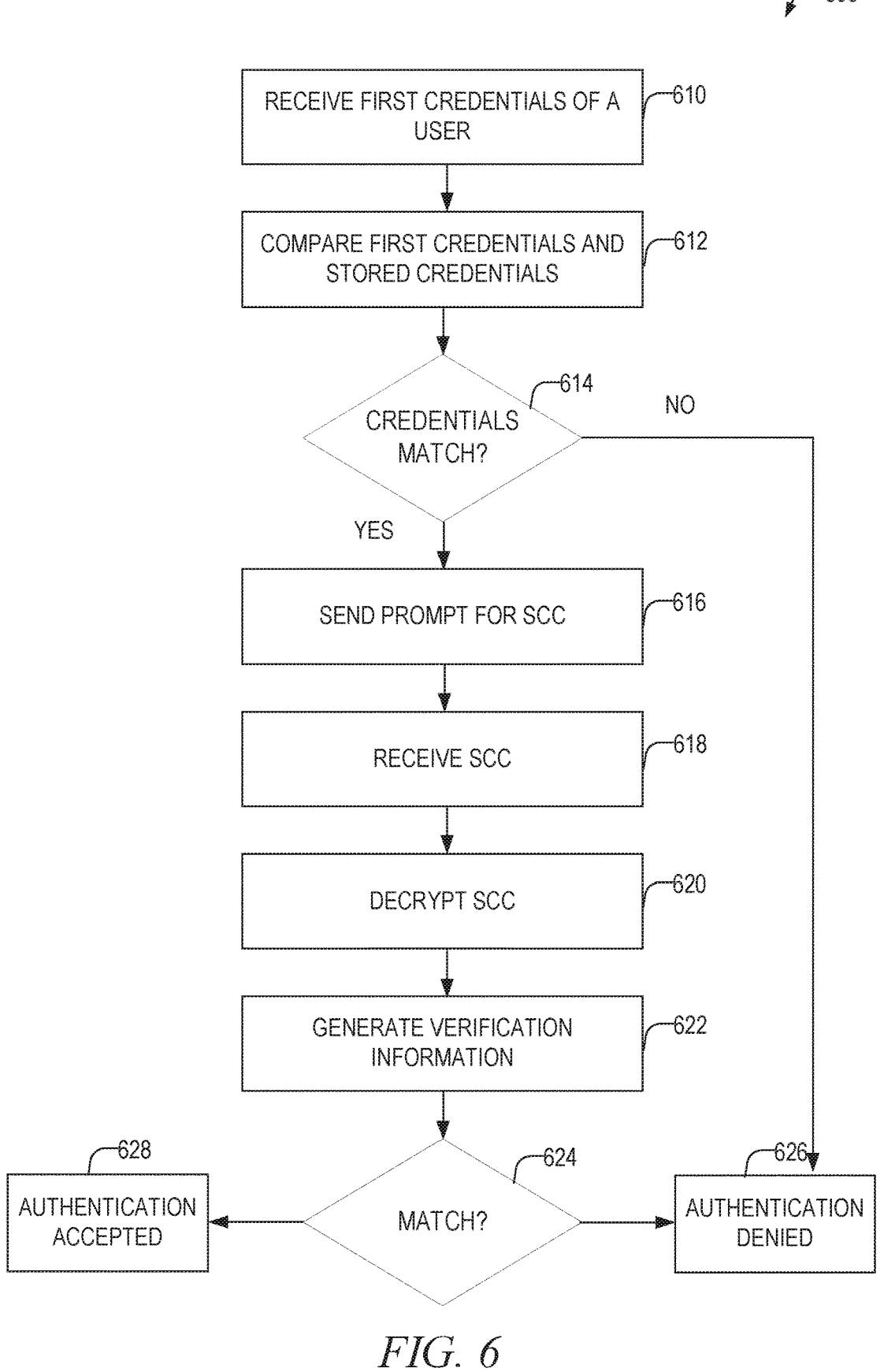
FIG. 6 discloses a flowchart illustrating the sequence of operations performed by an authenticating party in the form of a network-based service to authenticate a user within a multi-factor authentication framework according to some examples of the present disclosure.

FIG. 6 discloses a flowchart illustrating the sequence of operations performed by an authenticating party in the form of a network-based service to authenticate a user within a multi-factor authentication framework according to some examples of the present disclosure. At operation 610, the network-based service receives the first set of credentials from the user by the network-based service. These credentials are typically the user's account identifier, such as a username, and a secret key, such as a password. The user submits these details through a client device interface, which communicates with the network-based service to initiate the authentication process.

At operation 612, the user-provided credentials are compared against the credentials previously stored within the network-based service's secure database. This operation is conducted to establish the legitimacy of the user's claim to the account or service. At operation 614, the network-based service determines the outcome of the credential comparison. If the credentials provided by the user do not correspond to the stored credentials, the process flow proceeds to operation 626, where the user is denied authentication due to the mismatch of credentials.

Following a successful match in operation 614, control proceeds to operation 616 where the network-based service sends a request to a device of the user requesting the Secure Chip Code. This request may be displayed to the user on their client device and signifies the transition to the next phase of the multi-factor authentication process, which involves the additional security factor provided by the Secure Chip Code.

At operation 618, the network-based service receives the Secure Chip Code from a computing device of the user. For example, the user may input the SCC into their device which then transmits it to the network-based service. In other examples, the user's device may send the code through an Application Programming Interface (API) or other means. As previously described, the SCC may be an encrypted form of an OTP, an encrypted hash of the OTP, an encrypted hash of the OTP and other information, or the like.

At operation 620, the network-based service decrypts the SCC. For example, the network-based service may utilize the public key that corresponds to the private key of the user's chip-enabled card. This operation results in the retrieval of an unencrypted authentication token. In some examples, this token is an unencrypted OTP. In other examples, this token is a data structure comprising a hash of the OTP and card specified information along with the card specified information.

At operation 622, the network-based service generates verification information to compare to the unencrypted authentication token or portions of the unencrypted authentication token. For example, the network-based service may generate a corresponding OTP using the shared secret. This operation mirrors the process used by the Enhanced OTP generation device, utilizing the same shared secret and algorithm to produce a time-sensitive OTP. The service's generated OTP serves as a reference for validating the Secure Chip Code submitted by the user. In some examples in which the authentication token includes a hash of the original OTP, the generated OTP may then be hashed according to the same hashing function used by the card using both the OTP and the card specified information.

At operation 624, the network-based service compares the unencrypted authentication token against the verification information generated at operation 622. If they match, then at operation 628, the authenticating party concludes the authentication process with the user being successfully authenticated. The network-based service then grants the user access to the secure function or service they have requested, completing the multi-factor authentication sequence.

Conversely, if the hashes do not match, or if the initial credentials were not verified in operation 614, then at operation 626 the user's authentication is denied and the network-based service denies access to the secure function or service, and the user may be presented with options to attempt the authentication process again or to use alternative verification methods.

While at operations 620 the SCC is decrypted, in other examples, such as when only a portion of the SCC is provided (e.g., the five most or least significant digits) by the user's device, the network-based service may omit the operation 620. In these examples, the verification information generated at operation 622 may be encrypted using a same key that the chip card used to encrypt the SCC. This encrypted verification information may then be used at operation 624 to determine if the provided SCC matches the encrypted verification information or a portion of the provided SCC matches a same portion of the encrypted verification information.

Figure 7:
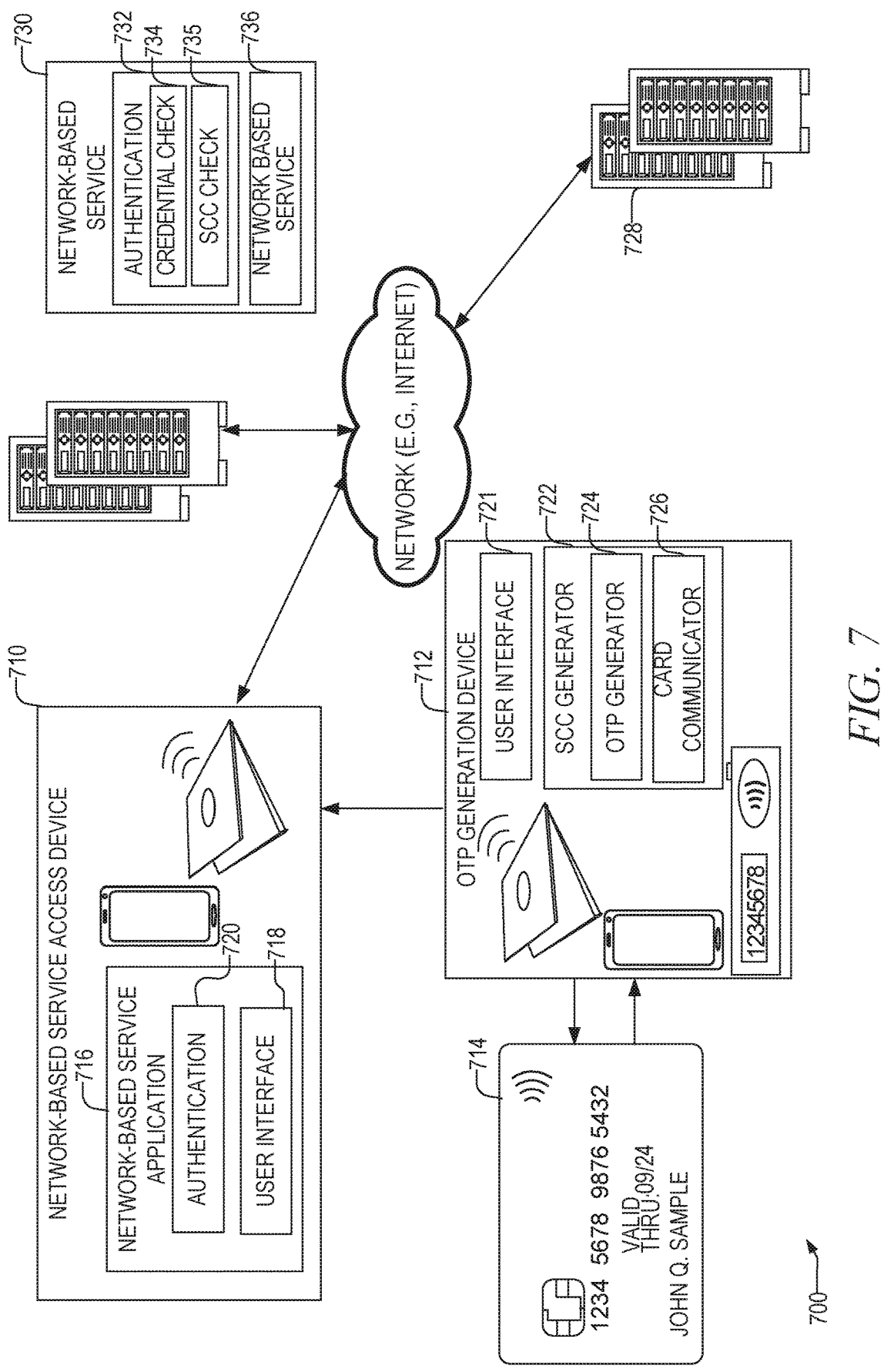
FIG. 7 illustrates an exemplary system for authenticating a user to a network-based service using a Secure Chip Code (SCC).

FIG. 7 illustrates an exemplary system 700 for authenticating a user to a network-based service using a Secure Chip Code (SCC). The system comprises network-based service access device 710, enhanced OTP generation device 712, and a network-based service 730, all interconnected via a network, such as the Internet. The network-based service access device 710 are utilized by users to access various services provided by the network-based service 730. The access device can be any form of computing device capable of connecting to the network, including but not limited to mobile phones, laptops, and desktop computers. The network-based service access device 710 includes an authentication component 720, which is responsible for facilitating the authentication process with the network-based service 730.

The enhanced OTP generation device 712 may be a same device as the network-based service access device 710. That is, the components of the enhanced OTP generation device 712 may be incorporated into the network-based service access device 710. In other examples, the enhanced OTP generation device may be different device. The enhanced OTP generation device 712 may generate a One-Time Password (OTP) and may include a variety of forms such as mobile phones, laptops, desktops, dedicated OTP generation keyfobs, or enhanced passbooks. Within the enhanced OTP generation device 712, there is a user interface component 721, which serves to display the OTP or SCC codes to the user. The user interface component may communicate with one or more displays, such as LCD, LED, OLED displays.

The chip-enabled card 714 interacts with the enhanced OTP generation device 712 to facilitate the generation of the SCC. The SCC Generator component 722 within the Enhanced OTP generation device 712 includes an OTP Generator 724 for creating the OTP and a card communicator component 726 for interfacing with the card 714 to obtain the SCC. The SCC is then provided to the network-based service access device 710. For example, the user may enter a SCC displayed on a user interface of the Enhanced OTP generation device 712 into the user interface provided by user interface component 718 and authentication component 720 of the network-based service application 716. In other examples, this may be automated by wired or wireless messaging between the enhanced OTP generation device 712 and network-based service access device 710. In examples in which the network-based service access device 710 and enhanced OTP generation device 712 are the same device, this may be accomplished through software-based communications such as Application Programming Interfaces, interprocess communication, library calls, or the like.

The network-based service 730 includes an authentication component 732, which works in conjunction with the authentication component 720 of the network-based service access device 710 to authenticate the user. Authentication component 732 may include a credential check component 734 for checking a user's credentials, such as username and password. In addition, the authentication component 732 may include a SCC check for checking the SCC. User interface component 718 provides a user interface to the network-based services, including interfaces for authentication procedures.

The issuer system 728 may be used by the network-based service 730 to decrypt the SCC. In other examples, the issuer system 728 may provide the public key necessary for the network-based service 730 to perform the decryption themselves.

Authentication component 732 authenticates the SCC, in some examples, by causing the decryption of the SCC using the public key of the card 714. This decryption may be done by the SCC check component 735 using the public key which may be obtained from the issuer system 728. In other examples, the SCC check component 735 may provide the SCC to the issuer system 728, which may decrypt it and return the decrypted authentication token. The SCC check component 735 may generate verification information which may, in some examples, be an OTP generated by the authentication component 732 using the same shared secret present in the Enhanced OTP generation device 712. In other examples, the verification information may be a hash of the OTP. In still other examples, the verification information may be a hash of the OTP and card specified data, which may be a known value between the network-based service and the card, or a card specified value included in the decrypted token.

This verification information, or a portion of the verification information may be compared to the decrypted token, or a portion of the decrypted token. If the information match, the SCC check is successful. If all the other requirements for authentication are successful (e.g., successful username and password checks), the user may be authenticated and may be provided access to the network-based service 736 or a protected operation of it. In some examples, various operations of the network-based service 736 may require different security levels that may require additional authentication checks. For example, the network-based service may provide some functionality to users upon a username and password authentication, but some protected operations may require an OTP. Some high security operations may require the entry of an SCC.

Figure 8:
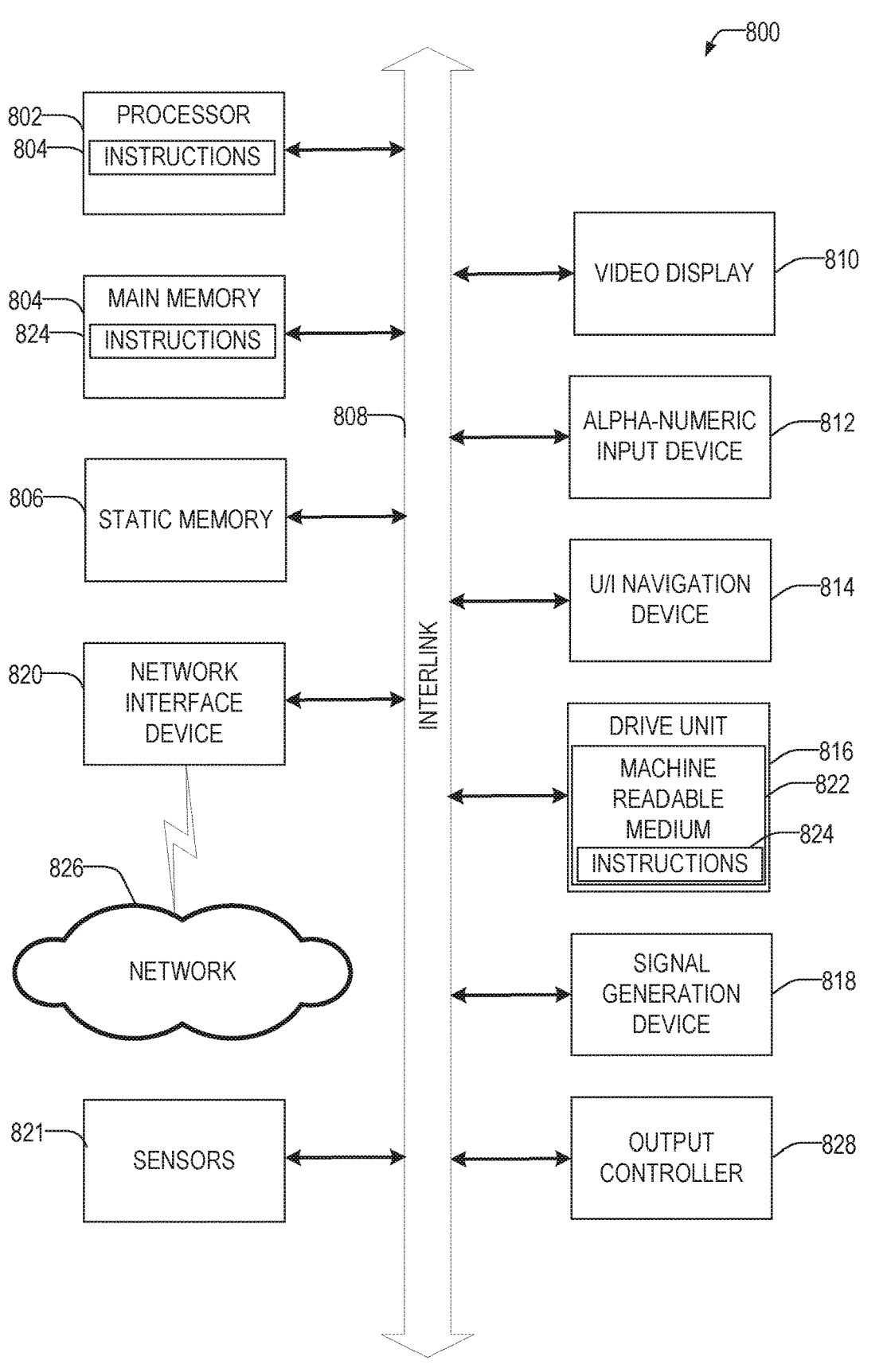
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a fob, personal computer (PC), laptop, a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The device 800 may be configured to be the enhanced OTP generation devices 105, 205, 410; or, enhanced OTP generation devices 105, 205, 410 may include one or more components of machine 800. Machine 800 may be configured to perform the methods 500 and 600 of FIGS. 5 and 6; and be configured to implement the devices and components of FIG. 7.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is an authentication method, comprising: using a hardware processor of a first computing device: generating an authentication code using a shared secret value; detecting a Near Field Communications (NFC) enabled card using an NFC reader communicatively coupled to the hardware processor; transmitting the authentication code to the NFC enabled card; receiving an encrypted token from the NFC enabled card, the encrypted token generated by the NFC enabled card using the authentication code and a cryptographic key of the card; and outputting the encrypted token.

In Example 2, the subject matter of Example 1 includes, wherein outputting the encrypted token comprises transmitting the encrypted token to a second computing device over a short-range wireless connection.

In Example 3, the subject matter of Example 2 includes, wherein the short-range wireless connection comprises an NFC, Bluetooth, or WIFI connection.

In Example 4, the subject matter of Examples 1-3 includes, wherein outputting the encrypted token comprises causing a display of the encrypted token or a portion of the encrypted token on a display communicatively coupled to the first computing device.

In Example 5, the subject matter of Examples 1-4 includes, using a second hardware processor of a second computing device: generating a second authentication code using the shared secret value; receiving, as part of an authentication of a user, the encrypted token; decrypting the encrypted token using a cryptographic key corresponding to the cryptographic key of the card to generate decrypted data;

determining whether the decrypted data corresponds to the second authentication code; and responsive to determining whether the decrypted data corresponds to the second authentication code, granting access to a network-based service or operation of a network-based service.

In Example 6, the subject matter of Example 5 includes, wherein the decrypted data comprises card specified data and wherein determining whether the decrypted data corresponds to the second authentication code comprises: utilizing a cryptographic hash of the second authentication code and card specified data and comparing the cryptographic hash with a portion of the decrypted data.

In Example 7, the subject matter of Examples 1-6 includes, wherein outputting the encrypted token comprises transmitting the encrypted token to a second computing device.

Example 8 is an authentication device, comprising: a hardware processor configured to perform operations comprising: generating an authentication code using a shared secret value; detecting a Near Field Communications (NFC) enabled card using an NFC reader communicatively coupled to the hardware processor; transmitting the authentication code to the NFC enabled card; receiving an encrypted token from the NFC enabled card, the encrypted token generated by the NFC enabled card using the authentication code and a cryptographic key of the card; and outputting the encrypted token.

In Example 9, the subject matter of Example 8 includes, wherein the operations of outputting the encrypted token comprises transmitting the encrypted token to a second computing device over a short-range wireless connection.

In Example 10, the subject matter of Example 9 includes, wherein the short-range wireless connection comprises an NFC, Bluetooth, or WIFI connection.

In Example 11, the subject matter of Examples 8-10 includes, wherein the operations of outputting the encrypted token comprises causing a display of the encrypted token or a portion of the encrypted token on a display communicatively coupled to the authentication device.

In Example 12, the subject matter of Examples 8-11 includes, wherein the operations further comprise: using a second hardware processor of a second computing device: generating a second authentication code using the shared secret value; receiving, as part of an authentication of a user, the encrypted token; decrypting the encrypted token using a cryptographic key corresponding to the cryptographic key of the card to generate decrypted data; determining whether the decrypted data corresponds to the second authentication code; and responsive to determining whether the decrypted data corresponds to the second authentication code, granting access to a network-based service or operation of a network-based service.

In Example 13, the subject matter of Example 12 includes, wherein the decrypted data comprises card specified data and wherein the operations of determining whether the decrypted data corresponds to the second authentication code comprises: utilizing a cryptographic hash of the second authentication code and card specified data and comparing the cryptographic hash with a portion of the decrypted data.

In Example 14, the subject matter of Examples 8-13 includes, wherein the operations of outputting the encrypted token comprises transmitting the encrypted token to a second computing device.

Example 15 is a non-transitory, machine-readable medium, storing instructions, which when performed by an authentication device, causes the authentication device to perform operations comprising: generating an authentication code using a shared secret value; detecting a Near Field Communications (NFC) enabled card using an NFC reader communicatively coupled to the authentication device; transmitting the authentication code to the NFC enabled card; receiving an encrypted token from the NFC enabled card, the encrypted token generated by the NFC enabled card using the authentication code and a cryptographic key of the card; and outputting the encrypted token.

In Example 16, the subject matter of Example 15 includes, wherein the operations of outputting the encrypted token comprises transmitting the encrypted token to a second computing device over a short-range wireless connection.

In Example 17, the subject matter of Example 16 includes, wherein the short-range wireless connection comprises an NFC, Bluetooth, or WIFI connection.

In Example 18, the subject matter of Examples 15-17 includes, wherein the operations of outputting the encrypted token comprises causing a display of the encrypted token or a portion of the encrypted token on a display communicatively coupled to the authentication device.

In Example 19, the subject matter of Examples 15-18 includes, wherein the operations further comprise: using a second hardware processor of a second computing device: generating a second authentication code using the shared secret value; receiving, as part of an authentication of a user, the encrypted token; decrypting the encrypted token using a cryptographic key corresponding to the cryptographic key of the card to generate decrypted data; determining whether the decrypted data corresponds to the second authentication code; and responsive to determining whether the decrypted data corresponds to the second authentication code, granting access to a network-based service or operation of a network-based service.

In Example 20, the subject matter of Example 19 includes, wherein the decrypted data comprises card specified data and wherein the operations of determining whether the decrypted data corresponds to the second authentication code comprises: utilizing a cryptographic hash of the second authentication code and card specified data and comparing the cryptographic hash with a portion of the decrypted data.

In Example 21, the subject matter of Examples 15-20 includes, wherein the operations of outputting the encrypted token comprises transmitting the encrypted token to a second computing device.

Example 22 is an authentication method comprising: using a hardware processor of a first computing device: generating an authentication code using a shared secret value; detecting a Near Field Communications (NFC) enabled card using an NFC reader communicatively coupled to the hardware processor; transmitting the authentication code to the NFC enabled card; receiving an encrypted token from the NFC enabled card, the encrypted token generated by the NFC enabled card using the authentication code and a cryptographic key of the NFC enabled card; and outputting the encrypted token. using a second hardware processor of a second computing device: generating a second authentication code using the shared secret value; receiving, as part of an authentication of a user, the encrypted token; decrypting the encrypted token using a cryptographic key corresponding to the cryptographic key of the NFC enabled card to generate decrypted data; determining whether the decrypted data corresponds to the second authentication code; and responsive to determining whether the decrypted data corresponds to the second authentication code, granting access to a network-based service or operation of a network-based service.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

What is claimed is:

1. An authentication method, comprising:

using a hardware processor of a first computing device:

generating a one-time passcode using a shared secret value, the shared secret value shared between the first computing device and a second computing device, the second computing device providing a network-based service;

detecting a Near Field Communications (NFC) enabled card using an NFC reader communicatively coupled to the hardware processor;

transmitting the one-time passcode to the NFC enabled card;

receiving an encrypted token from the NFC enabled card, the encrypted token generated by the NFC enabled card using the one-time passcode and a cryptographic key of the NFC enabled card;

outputting a value based upon the encrypted token on a display of the first computing device; and providing login credentials input by a user and the value as separate authentication factors to the second computing device to authenticate the user of the first computing device to the second computing device to access an account of the user on the network-based service.

2. The authentication method of claim 1, further comprising:

using a second hardware processor of the second computing device:

generating a second one-time passcode using the shared secret value;

receiving, as part of an authentication of the user, the encrypted token;

decrypting the encrypted token using a cryptographic key corresponding to the cryptographic key of the NFC enabled card to generate decrypted data;

determining whether the decrypted data corresponds to the second one-time passcode; and responsive to determining whether the decrypted data corresponds to the second one-time passcode, granting access to the network-based service or operation of the network-based service.

3. The authentication method of claim 2, wherein the decrypted data comprises card specified data and wherein determining whether the decrypted data corresponds to the second one-time passcode comprises:

utilizing a cryptographic hash of the second one-time passcode and the card specified data and comparing the cryptographic bash with a portion of the decrypted data.

4. The method of claim 1, wherein the NFC enabled card is a bank card issued by a financial institution and wherein the network-based service is a banking application providing access to a financial account of the user.

5. The method of claim 1, wherein the one-time passcode is a time-based one-time-passcode (TOTP).

6. An authentication device, comprising:

a hardware processor configured to perform operations comprising:

generating a one-time passcode using a shared secret value, the shared secret value shared between the authentication device and a second computing device, the second computing device providing a network-based service;

detecting a Near Field Communications (NFC) enabled card using an NFC reader communicatively coupled to the hardware processor;

transmitting the one-time passcode to the NFC enabled card;

receiving an encrypted token from the NFC enabled card, the encrypted token generated by the NFC enabled card using the one-time passcode and a cryptographic key of the NFC enabled card;

outputting a value based upon the encrypted token on a display of the authentication device; and providing login credentials input by a user and the value as separate authentication factors to the second computing device to authenticate the user of the authentication device to the second computing device to access an account of the user on the network-based service.

7. The authentication device of claim 6, wherein the operations further comprise:

using a second hardware processor of the second computing device:

generating a second one-time passcode using the shared secret value;

receiving, as part of an authentication of the user, the encrypted token;

decrypting the encrypted token using a cryptographic key corresponding to the cryptographic key of the NFC enabled card to generate decrypted data;

determining whether the decrypted data corresponds to the second one-time passcode; and responsive to determining whether the decrypted data corresponds to the second one-time passcode, granting access to the network-based service or operation of the network-based service.

8. The authentication device of claim 7, wherein the decrypted data comprises card specified data and wherein the operations of determining whether the decrypted data corresponds to the second one-time passcode comprises:

utilizing a cryptographic hash of the second one-time passcode and the card specified data and comparing the cryptographic hash with a portion of the decrypted data.

9. The authentication device of claim 6, wherein the NFC enabled card is a bank card issued by a financial institution and wherein the network-based service is a banking application providing access to a financial account of the user.

10. The authentication device of claim 6, wherein the one-time passcode is a time-based one-time-passcode (TOTP).

11. A non-transitory, machine-readable medium, storing instructions, which when performed by an authentication device, causes the authentication device to perform operations comprising:

generating a one-time passcode using a shared secret value, the shared secret value shared between the authentication device and a second computing device, the second computing device providing a network-based service;

detecting a Near Field Communications (NFC) enabled card using an NFC reader communicatively coupled to the authentication device;

transmitting the one-time passcode to the NFC enabled card;

receiving an encrypted token from the NFC enabled card, the encrypted token generated by the NFC enabled card using the one-time passcode and a cryptographic key of the NFC enabled card;

outputting a value based upon the encrypted token on a display of the authentication device; and providing login credentials input by a user and the value as separate authentication factors to the second computing device to authenticate the user to the second computing device to access an account of the user on the network-based service.

12. The non-transitory, machine-readable medium of claim 11, wherein the operations further comprise:

using a second hardware processor of the second computing device:

generating a second one-time passcode using the shared secret value;

receiving, as part of an authentication of the user, the encrypted token;

decrypting the encrypted token using a cryptographic key corresponding to the cryptographic key of the NFC enabled card to generate decrypted data;

determining whether the decrypted data corresponds to the second one-time passcode; and responsive to determining whether the decrypted data corresponds to the second one-time passcode, granting access to the network-based service or operation of the network-based service.

13. The non-transitory, machine-readable medium of claim 12, wherein the decrypted data comprises card specified data and wherein the operations of determining whether the decrypted data corresponds to the second one-time passcode comprises:

utilizing a cryptographic hash of the second one-time passcode and the card specified data and comparing the cryptographic hash with a portion of the decrypted data.

14. The non-transitory machine-readable medium of claim 12, wherein the NFC enabled card is a bank card issued by a financial institution and wherein the network-based service is a banking application providing access to a financial account of the user.

15. The non-transitory machine-readable medium of claim 12, wherein the one-time passcode is a time-based one-time-passcode (TOTP).

\* \* \* \* \*